United States Patent [19]

Yevick

[11] 4,357,077

[45] Nov. 2, 1982

[54] HIGH POWERED LASER WINDOW-MIRROR

[76] Inventor: George J. Yevick, 536 Nordhoff Dr., Leonia, N.J. 07605

[21] Appl. No.: 196,759

[22] Filed: Oct. 14, 1980

[51] Int. Cl.³ .............................................. G02B 5/08
[52] U.S. Cl. .................................... 350/310; 350/319; 350/452
[58] Field of Search ............................. 350/310, 319

[56] References Cited

U.S. PATENT DOCUMENTS

| | | | |
|---|---|---|---|
| 3,731,992 | 5/1973 | Mansell | 350/310 |
| 3,923,383 | 12/1975 | Engel et al. | 350/310 |
| 4,121,175 | 10/1978 | Hamil et al. | 350/319 X |
| 4,221,469 | 9/1980 | Stalcup et al. | 350/310 |

*Primary Examiner*—F. L. Evans
*Attorney, Agent, or Firm*—Thomas J. Greer, Jr.

[57] ABSTRACT

A laser window is formed of spaced transparent strips with a high total surface area that lends itself to cooling by conduction heat transfer to metal channels between the strips. The metal channels carry either a fast flowing refrigerant or heat-pipe wick and fluid. One or both sides of the metal cooling channels can act as mirrors.

6 Claims, 13 Drawing Figures

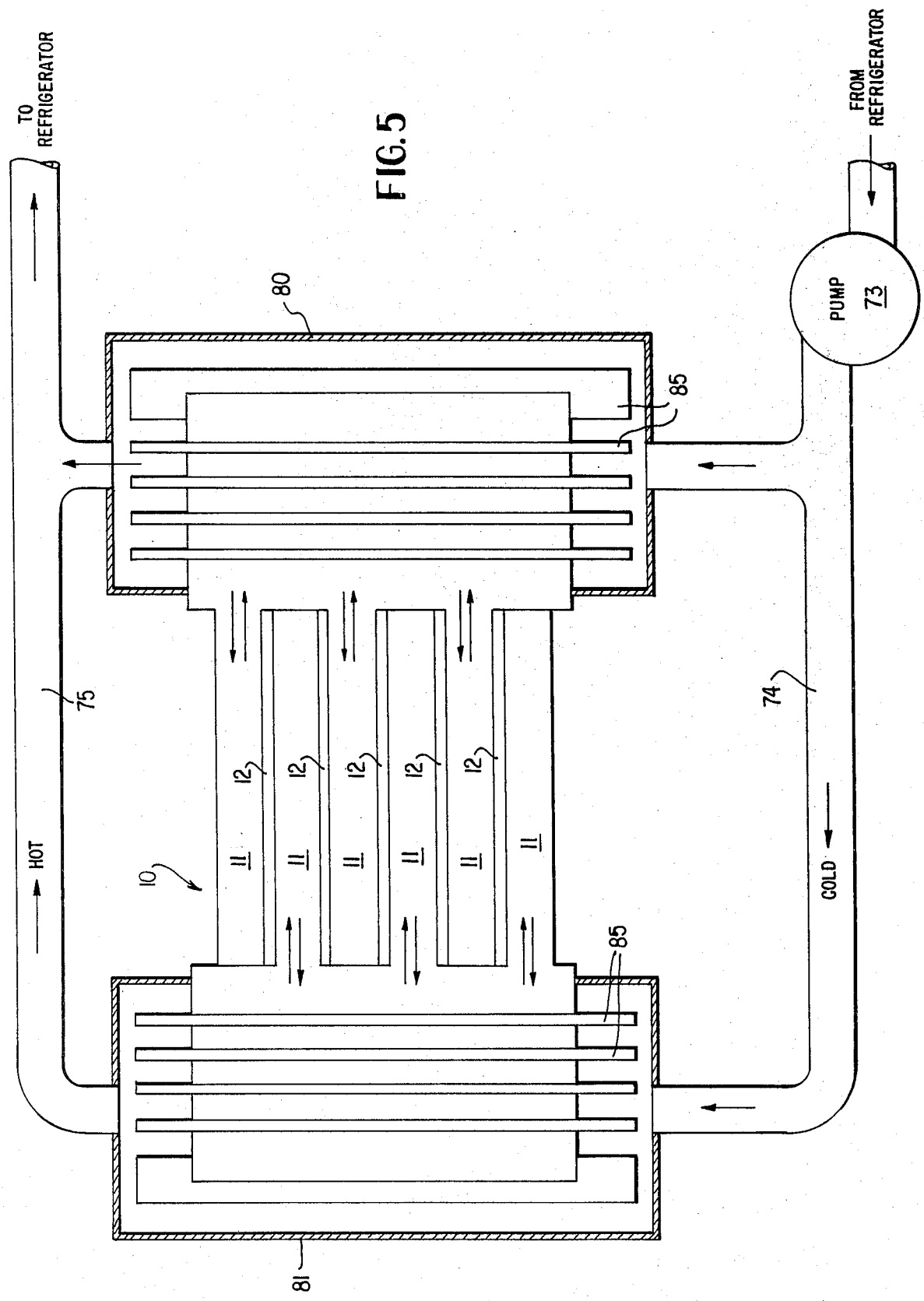

HIGH POWERED LASER WINDOW-MIRROR

This invention relates to a laser construction and more particularly to improvements in a window for a laser. A window is that part of a laser through which its energy (the laser beam) is extracted.

The need for windows for very high power lasers is well known. A major operating problem is that if the radiant heat absorbed by the window is not rapidly removed, the temperature increase due to such energy absorption gives rise to strong thermal gradients in the window, which in turn lead to changes in the window's index of refraction. With a non-uniform index the window performs poorly from the point of view of controlling the radiant energy. As analysis of this problem is to be found in an article by M. Sparks, *Journal of Applied Physics*, Vol. 42, p. 5029, 1971, entitled "Optical Distortion by Heated Windows in High-Power Laser Systems", herein incorporated by reference.

A fundamental heat problem in laser windows is that if the window is relatively small in diameter and the laser power transmitted through the window is large, then the electromagnetic energy density in the window must of necessity also be large. Edge cooling of small windows is relatively simple, for small window diameters, but very high electromagnetic energy density will destroy the optical quality of the window nevertheless. One can make a larger diameter window with attendant smaller energy density, but then cooling of the interior regions of the window increases in difficulty.

This dilemma is avoided, by this invention, by making the window in the form of spaced transparent strips with a high total surface area that easily lends itself to cooling by conduction heat transfer to metal channels between the strips, which channels carry either a fast flowing refrigerant or heat-pipe wick and fluid. Heat transfer by conducting heat energy absorbed by the window away from it is very efficient and hence the user of this invention can enjoy large energy densities prevailing over extended window areas. This makes possible the extraction, transmission, and focusing of very large amounts of laser energy.

The focusing action, if desired, can be achieved either by a fresnel lens type construction of the transparent ribbon or by making the transparent ribbon into a fresnel zone plate. The two devices are optically quite different, although superficially they may have a similar appearance. For a discussion of fresnel zone plates, see Jenkins and White, "Fundamentals of Optics", 3rd Edition, McGraw-Hill Publishers, pp. 355 to 361, incorporated by reference.

One or both sides of the metal cooling channels can act as regular mirrors. Or, if desired, one or both sides of the metal heat conductor can be made into fresnel mirrors or fresnel zone plate mirrors.

IN THE DRAWINGS

FIG. 5 is a partially schematic view similar to FIG. 1, modified by heat pipes emanating from both sides.

Figure 10A:
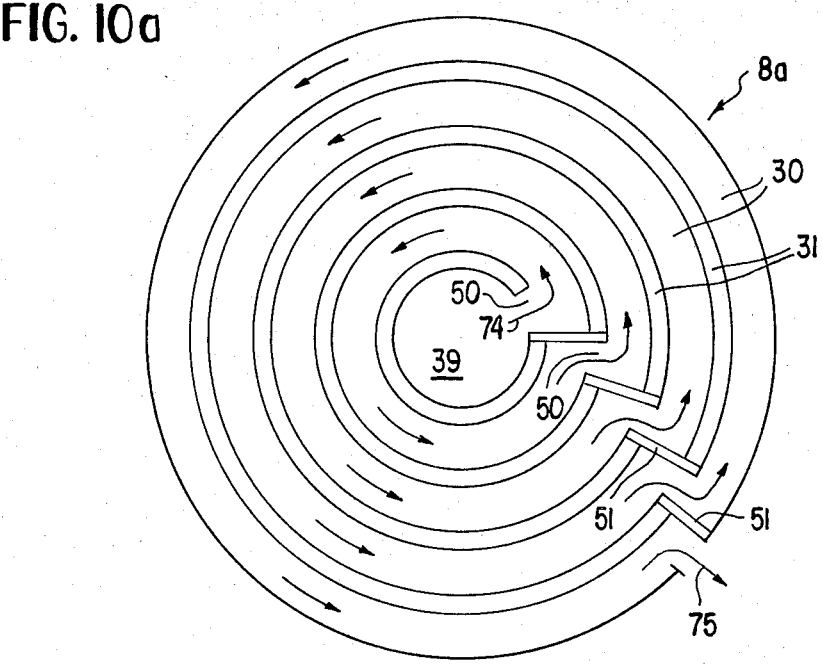
Figure 10B:
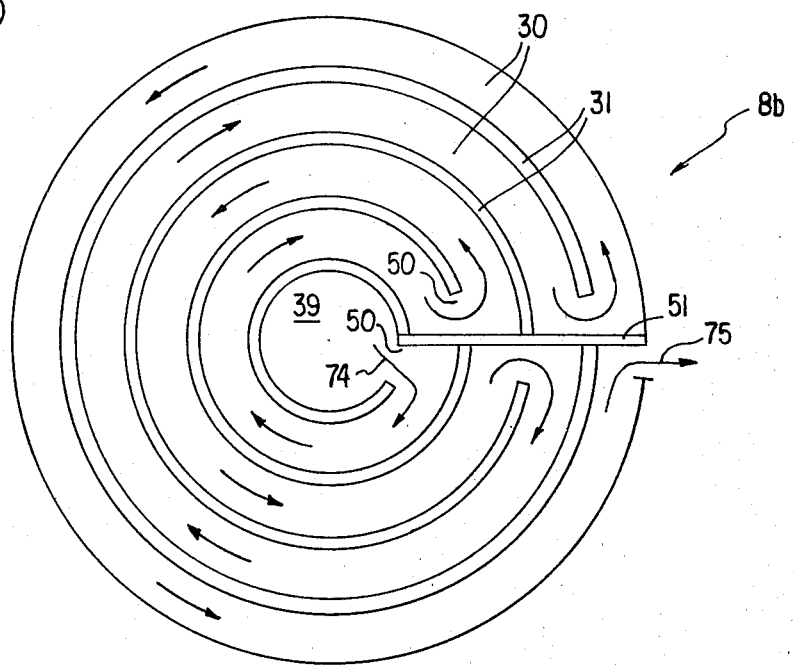
Figure 10C:
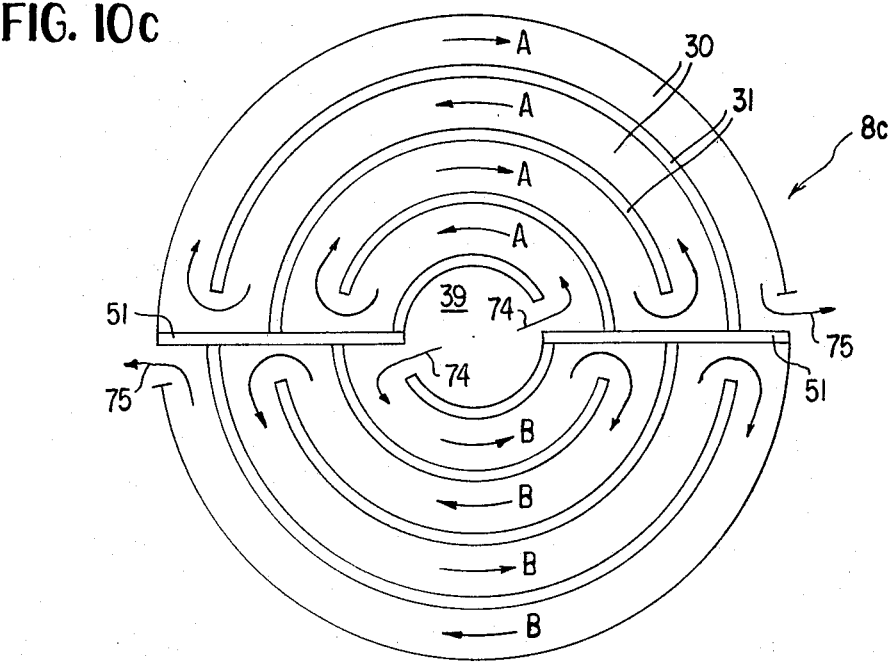

FIGS. 10*a*, 10*b* and 10*c* show three modifications of liquid coolant flow patterns within heat conducting channels of a laser window of this invention.

Figure 11:
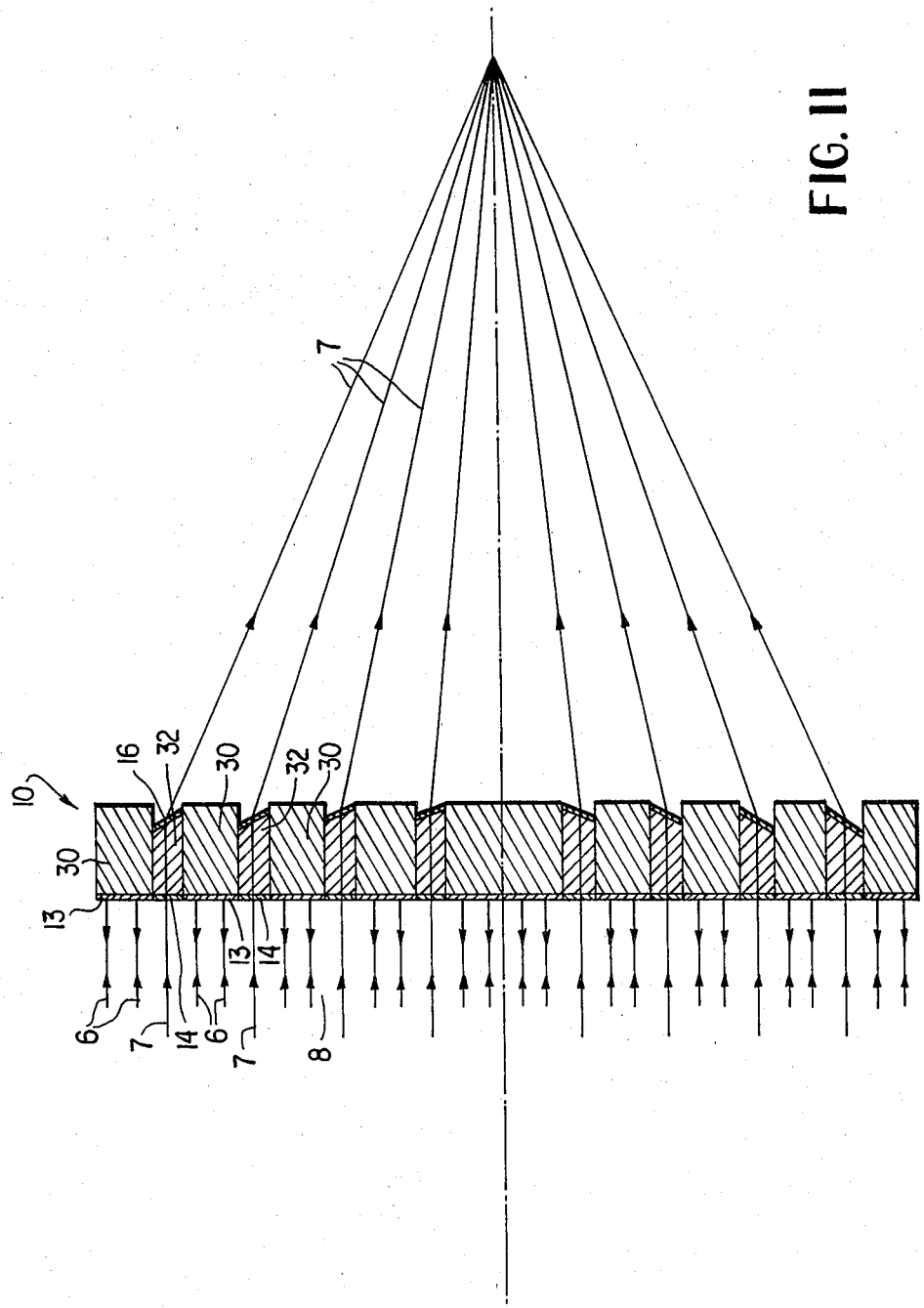

FIG. 11 is a cross-section of a laser window showing the focusing action of a fresnel lens construction.

Figure 1:
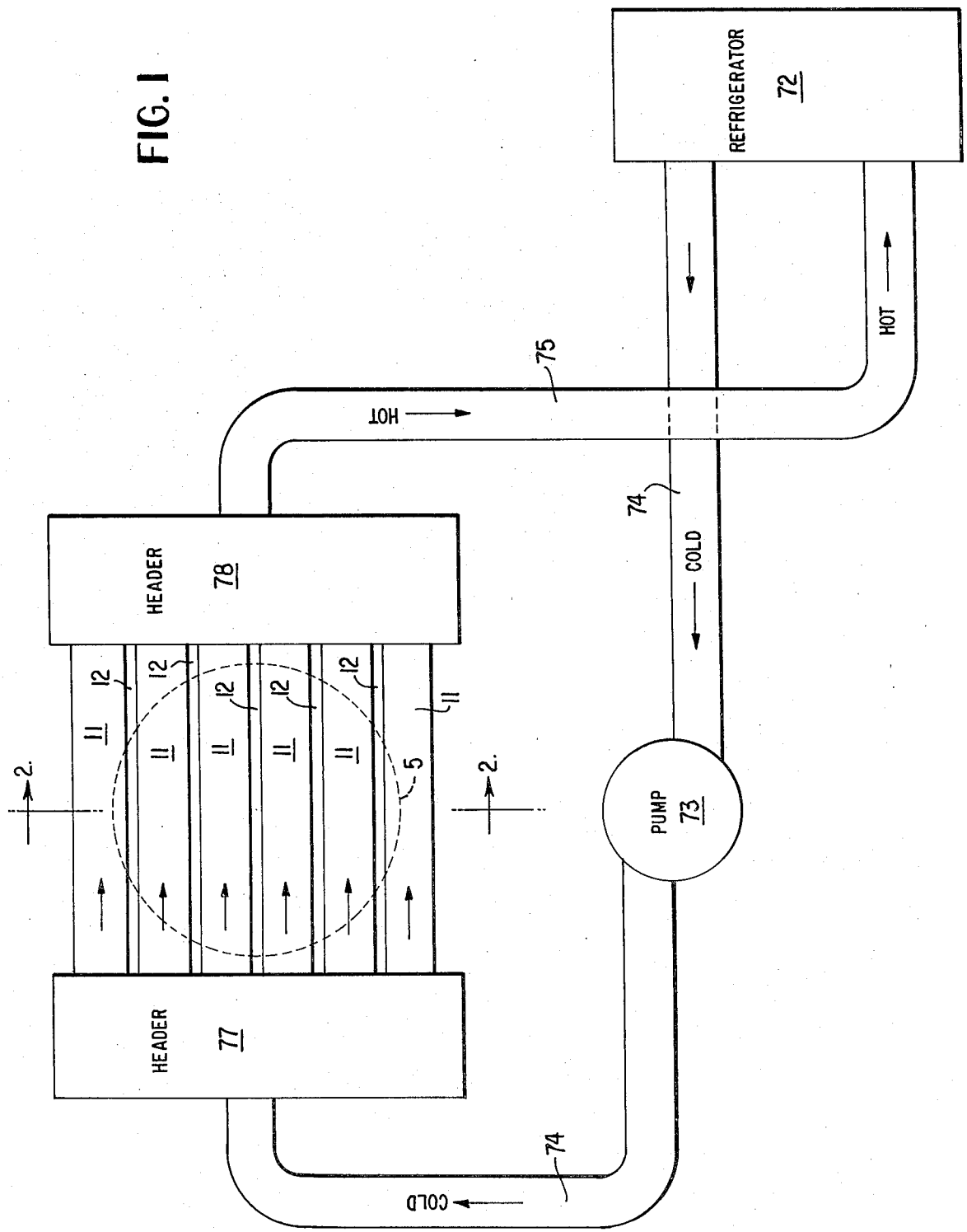
FIG. 1 is a partially schematic view of a straight channel laser window with the cooling system of this invention.
Figure 2:
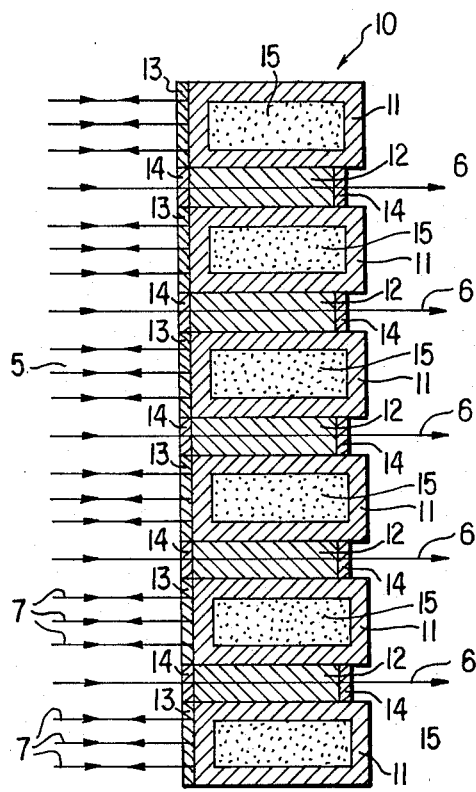
FIG. 2 is a section taken along line 2—2 of FIG. 1.

Referring now to FIGS. 1 and 2, a refrigerator 72 provides a cooled working substance, such as any known liquid refrigerant, which is forced by pump 73 through conduit 74 into a header 77 which feeds a plurality of straight pipes 11 having channels or lumina 15 of rectangular or other cross-section. The front (left) surface of each pipe 11 is polished and provided with a dielectric layer 13 which defines a highly reflecting mirror surface. The use of one or more dielectric coatings on a metal to enhance reflection of electromagnetic radiation from the metal surface is well known. Between the pipes 11, layers of transparent window materials 12, e.g., fused quartz or silicon, are positioned to function as windows. The front and rear surface of each transparent window 12 is dielectrically coated as indicated by numeral 14 which permits very high transmission of electromagnetic radiation. The use of one or more dielectric coatings on a transparent substance, to enhance the transmission of electromagnetic radiation therethrough, is also well known. When a powerful laser beam 5 is incident on the face of pipe and strip ensemble 10, this ensemble acts both as a mirror and as a window for the beam. Thus, the ensemble 10 defines a laser window and a laser mirror. The ratio of reflected laser light 7 to transmitted laser light 6 depends primarily on the ratio of the respective areas of mirror surfaces of pipes 11 and stripes 12. The liquid coolant rapidly flowing inside pipes 11 by virtue of pump 73 enters a second header 78 at a slightly higher temperature, due to the absorption by pipes 11 of some radiant energy from laser beam 5. The warmer liquid coolant in conduit 75 is now passed back to refrigerator 72 which brings the working substance temperature down to that desired to cool pipes 11.

FIG. 2 may be regarded as illustrating the case where the mirror surfaces 13 have an infinite radius of curvature. The laser window including dielectric coatings 14 on the left and right faces of transparent window material 12 is a plane window with parallel sides, i.e., a lens with focal length equal to infinity. If one desires to maintain exact coherence of the emerging laser beams 6, the width of each strip 12 must be accurate to within a fraction of the wavelength of the light in laser interior beam 5. Because the area of contact between pipes 11 and strips 12 can be extremely large, the rate of heat transfer between them can be high, hence the temperature differentials between the liquid coolant, mirror portions of pipes 11 and strips 12 can be made negligible.

In FIG. 2, the general case where the width of the strips 12 is not the same as the width of the pipes 11 is illustrated. However, for greater ease of fabrication, the same width of each is preferred.

In general, the strips 12 are optically coated both front and back (left and right as viewed in FIG. 2) in order to achieve maximum transmission of laser light. As is well known to those familiar with the art of optical coating, it is possible to utilize the index of refraction of strips 12 themselves so that only a minimum number of coatings is required, e.g., dielectric coatings 13 and 14 may be identical, with coating 13 acting as a mirror surface and coating 14 as a transmitting surface.

Figure 4:
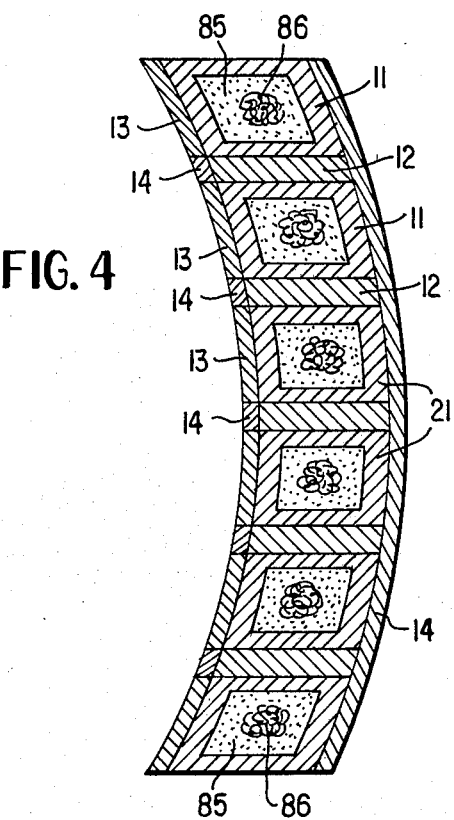
FIG. 4 is a section taken along line 4—4 of FIG. 3.
Figure 3:
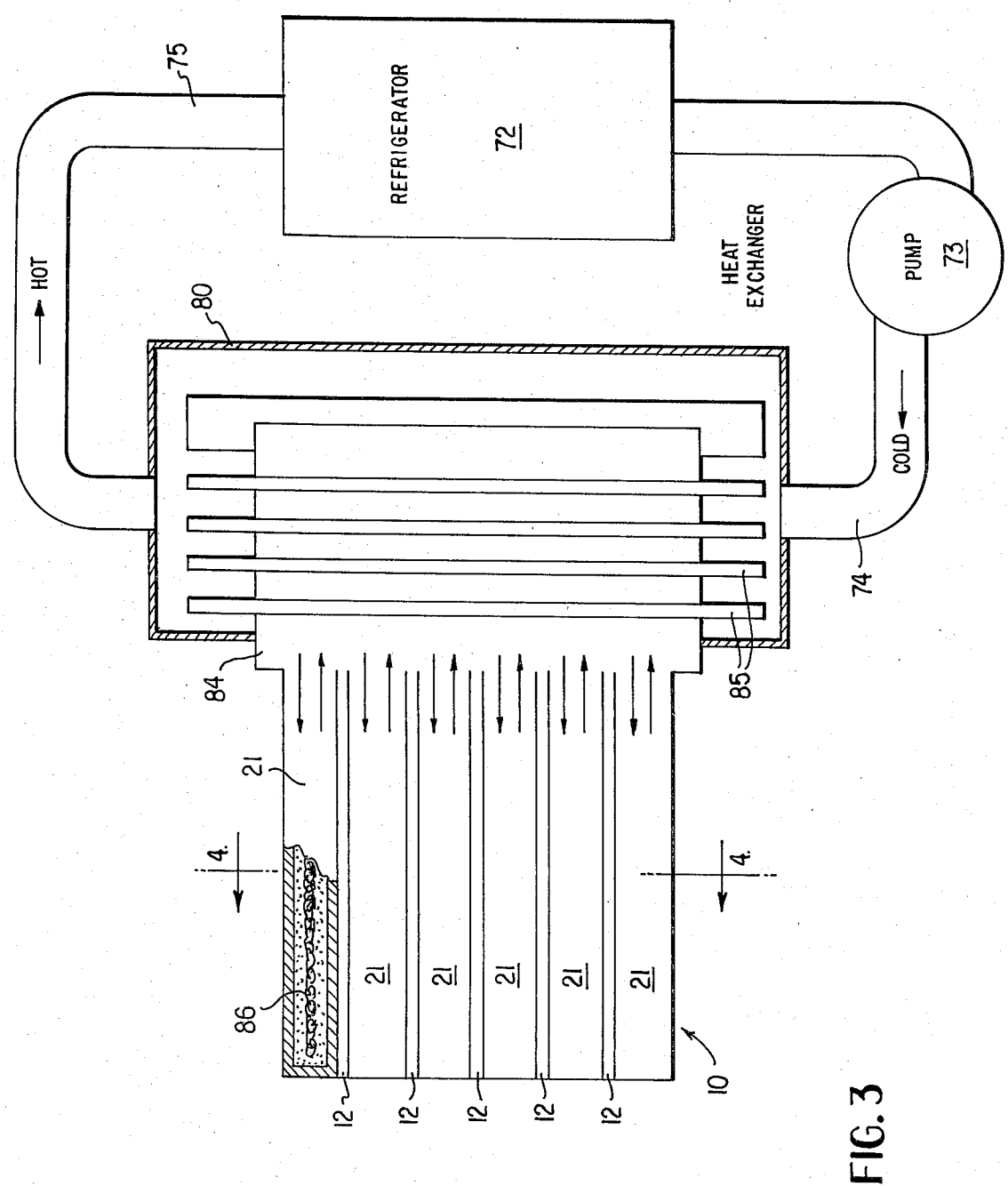
FIG. 3 is a partially schematic view of the cooled laser window construction of FIG. 1 utilizing heat pipes from one side.

Referring now to FIGS. 3 and 4, a spherical mirror and window ensemble 10 similar to that of FIG. 1 is shown. The cooling arrangement however is different. A set of heat pipes 21, corresponding to pipes 11 of FIGS. 1 and 2, is provided, each with a dielectric coating 13. Strips 12 also carry one or more dielectric coatings 14. Each heat pipe has along its lumen a wick 86 which carries liquid coolant from header 84. Upon absorption of laser energy by pipes 21 (the left faces thereof as viewed in FIG. 4), the liquid in the wicks is vaporized and condenses near the cooler (right) end of FIG. 3. Fins 85 attached to header 84 are cooled by a coolant 74 working substance which is kept cool by refrigerator 72, as in the manner of the scheme shown in FIG. 1.

FIG. 5 shows an arrangement having two headers, enclosed by casings 80 and 81, instead of one as in FIG. 3. More rapid heat transfer between strips 12 and liquid coolant in the pies is thereby realized.

Figure 7:
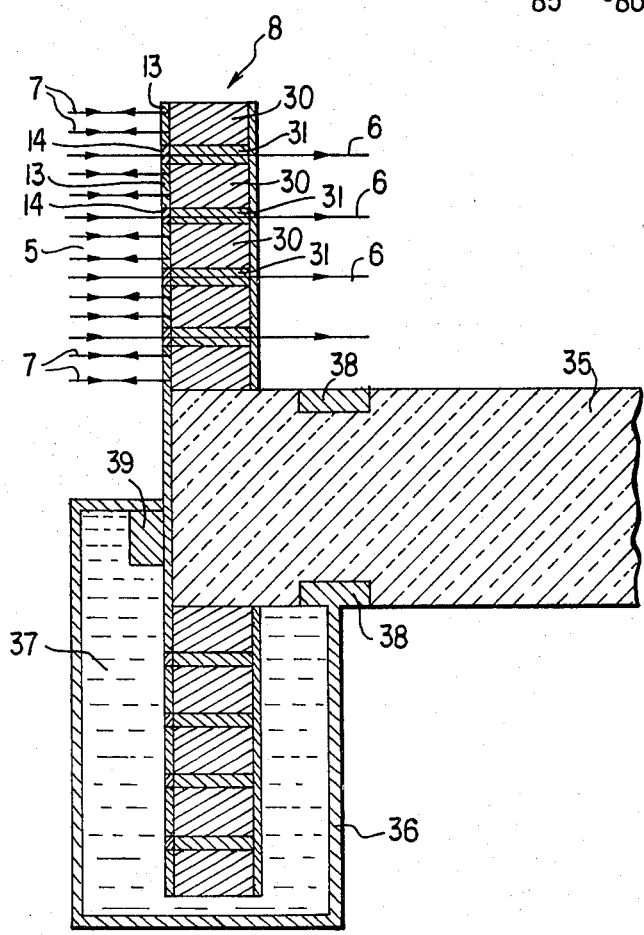
FIG. 7 is a section taken along line 7—7 of FIG. 6.
Figure 6:
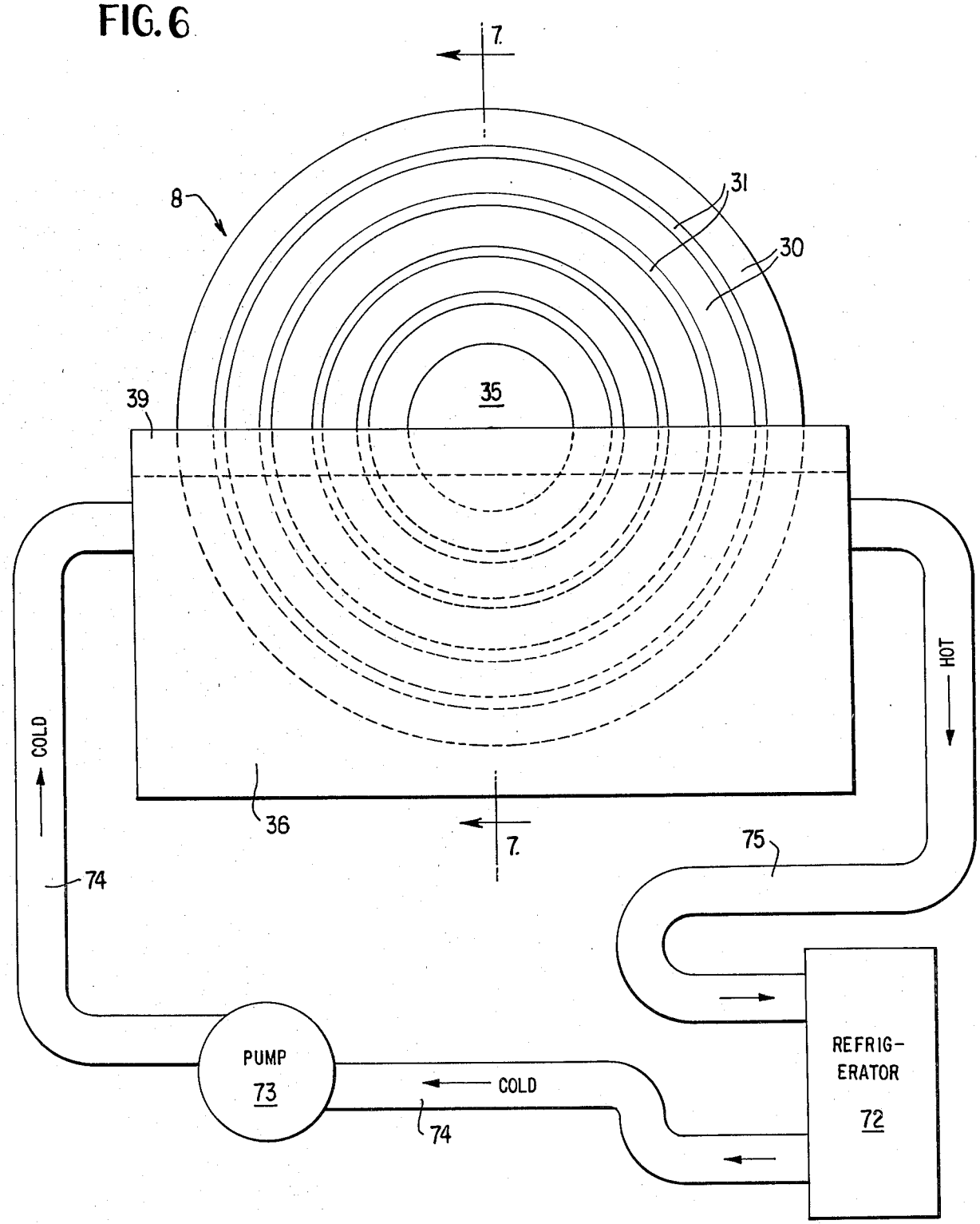
FIG. 6 is a partially schematic front view of another embodiment of a cooled laser window, this embodiment utilizing window rotation with a dip-type cooling mechanism.

FIGS. 6 and 7 illustrate a mirror and strip window 8 wherein heat conducting ring shaped mirrors 30 and strips 31 are positioned and formed as concentric rings mounted on a rotating shaft 35 to form a rotatable disc. As seen in FIG. 7, the mirrors 30, each provided with dielectric coating 13, are solid heat conductors which may be formed for example of molybdenum. The strips 31 which may also be dielectrically coated are cooled by transferring a part of the heat of laser beam 5 absorbed by the strips to the metal rings 30 and thence transferring heat in the rings to a coolant bath 37 in container 36 by virtue of continuous rotation of disc 8 in the coolant. Coolant 74 is pumped by pump 73 through container 36, thereafter becoming hotter coolant 75. Refrigerator 72 reduces the temperature of heated coolant 75 for continuous operation.

The rotating laser window disc 8 is driven by a shaft 35 on any desired bearing support 38 by any desired driving mechanism, e.g., pulley belt or the like, not shown. A wiper or doctor blade 39 mounted on container 36 inhibits the liquid coolant from riding up out of container 36 on the surfaces of disc 8. The transmitted or extracted laser beam, as before, is denoted by the numeral 6.

Figure 8:
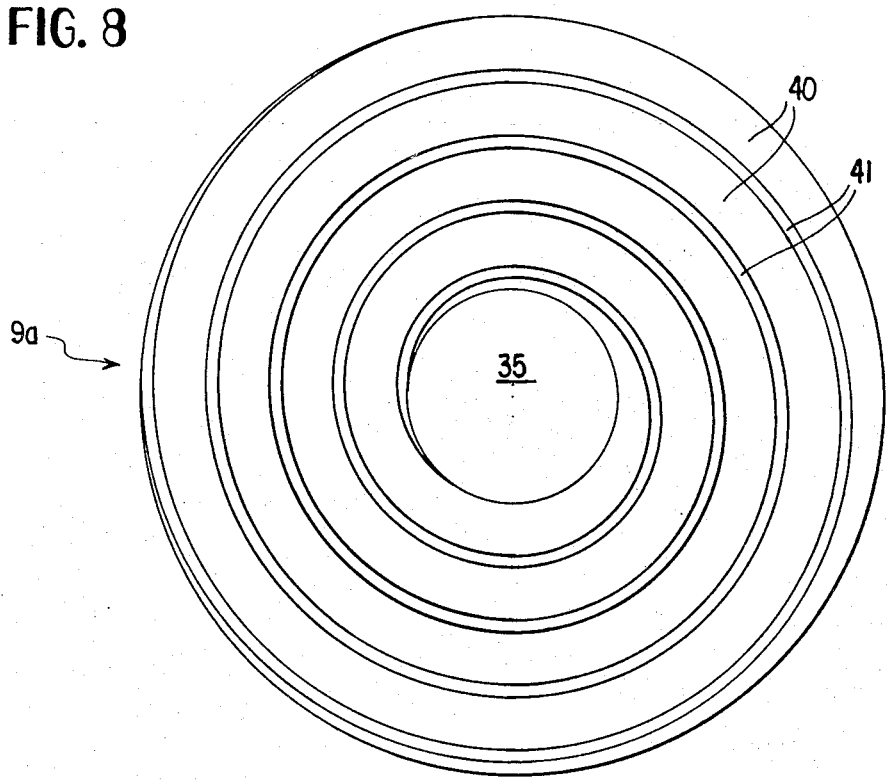
FIG. 8 is a front view of still another embodiment of a cooler laser window, wherein the rotating window is made of spiral elements.

FIG. 8 shows a modification of disc 8 of FIG. 7. The mirrors and strips, instead of being concentric circular rings, are formed by continuous spirals mounted on shaft 35 to thereby comprise laser window disc 9a. One spiral forms the strips, one the mirrors. The mode of cooling and mode of operating as a laser window are similar to that described with reference to FIGS. 6 and 7.

Figure 9:
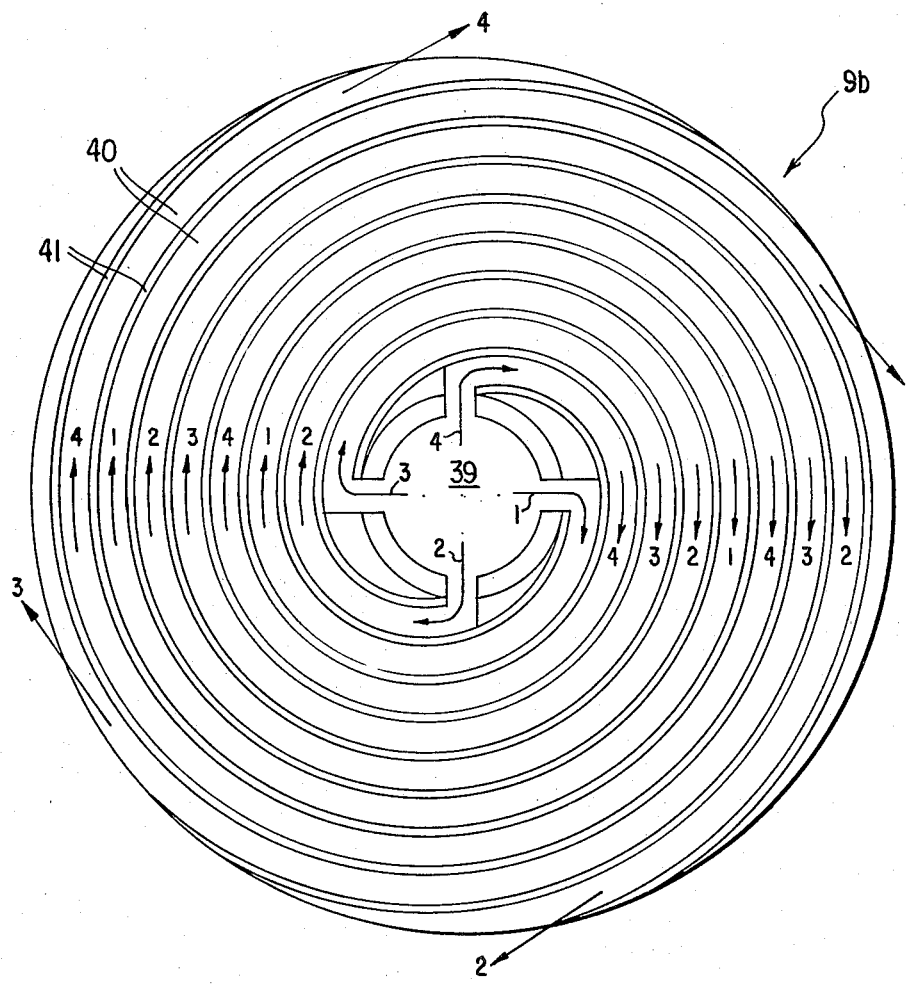
FIG. 9 is a plan view of a laser window wherein the coolant through metal conducting channels is centrifugally pumped by rotation of the laser window itself.

FIG. 9 illustrates a mirror and strip laser window disc 9b according to another embodiment, here functioning as a centrifugal pump. Liquid coolant from a hollow shaft 39 (similar to shaft 35) is centrifugally driven through four radial ports the disc forming a spiral structure having four spiral passageways or pipes 1, 2, 3 and 4. These spirals, designated generally as 40, are hollow, heat-conducting pipes containing liquid coolant, with one portion, as before, defining mirrors. Positioned between the spiral pipes are four spiral strips 41 which are transparent to laser beam 5. The coolant is collected at the periphery of disc 9b, at the open ends of each pipe, in the usual centrifugal pump manner. A four arm spiral is shown in FIG. 9. Clearly, one, two, three, etc. spirals can be made.

FIGS. 10a, 10b and 10c illustrate different types of coolant flow patterns, employing the alternate ring and strip construction of FIGS. 6 and 7. The discs 8a, 8b and 8c are made of hollow, heat conducting rings with baffles 51 and openings 50 which create several types of coolant flow.

In FIG. 10a, the disc 8a causes the coolant flow to be essentially similar to a one-arm spiral flow, and again the rotation of the disc 8a about shaft 36 drives coolant 74 centrifugally outward. A pump 73 may act in tandem with this centrifugal pumping.

In FIG. 10b, the disc 8b has baffles 51 and bends 50 so arranged that the flow between adjacent radially spaced channels is opposite in direction.

The disc 8c in FIG. 10c shows a more complex flow resulting from two entrance ports to thereby produce two flow paths A and B.

FIG. 11 is a cross-sectional view, similar to FIG. 7, showing a modification of a mirror and strip ensemble wherein the laser window functions as a fresnel lens. The laser beam exit surfaces 16 are carried by transparent prism strips 32 which bend the transmitted laser light rays 6 into a focus. Hence the intensity of the laser radiation at the focal-spot P will be large.

I claim:

1. A window for a laser to facilitate the extraction of absorbed, injurious laser light energy from the window, the assembly including,
   (a) a plurality of spaced mirrors which reflect laser light emanating from the interior of the laser back to the interior of the laser,
   (b) a plurality of spaced strips which transmit laser light through the interior of the laser to outside of the laser,
   (c) each said strip positioned between and contacting a portion of adjacent mirrors and being in heat conducting relation thereto,
   (d) means for continually cooling each of said mirrors,
   (e) whereby heat energy absorbed by the strips as laser light passes therethrough at least partially passes by conduction to the mirrors from whence it is carried away by the said means for cooling the mirrors.

2. The assembly of claim 1 wherein each of said mirrors is defined by a portion of the surface of a hollow pipe, and wherein the said means for cooling includes a liquid coolant which continually flows through the pipe lumen.

3. The assembly of claim 1 wherein the said mirrors are defined by a portion of a continuous spiral having radially spaced whorls, and wherein the said strips are defined by a continuous spiral having radially spaced whorls which transmit laser light, each strip positioned between and contacting a portion of radially adjacent mirror whorl.

4. The assembly of claim 3 wherein said mirror spiral is a portion of a hollow pipe, and wherein the means for cooling includes a liquid coolant which continually flows through the pipe lumen.

5. The assembly of claim 1 or 3 wherein the mirrors and strips together define a disc, the lower part of the disc being rotatable in a coolant bath, the coolant bath defining the means for cooling.

6. The assembly of claim 5 wherein the mirrors and windows are defined by alternate radially spaced rings.

* * * * *